(12) United States Patent
Baek et al.

(10) Patent No.: US 10,804,511 B2
(45) Date of Patent: Oct. 13, 2020

(54) BATTERY ARRAY FRAME INCLUDING FRAME RAIL INSERT

(71) Applicant: FORD GLOBAL TECHNOLOGIES, LLC, Dearborn, MI (US)

(72) Inventors: Hyung Min Baek, Ann Arbor, MI (US); Rajaram Subramanian, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 7 days.

(21) Appl. No.: 16/366,055

(22) Filed: Mar. 27, 2019

(65) Prior Publication Data

US 2019/0221799 A1    Jul. 18, 2019

Related U.S. Application Data

(62) Division of application No. 14/607,309, filed on Jan. 28, 2015, now Pat. No. 10,319,964.

(51) Int. Cl.
*H01M 2/10* (2006.01)
*B60K 1/04* (2019.01)

(52) U.S. Cl.
CPC ....... *H01M 2/1077* (2013.01); *H01M 2/1083* (2013.01); *B60K 1/04* (2013.01); *H01M 2220/20* (2013.01)

(58) Field of Classification Search
CPC ............. H01M 2/1077; H01M 2/1083; H01M 2/1217; H01M 2/1252; H01M 2/1241; H01M 2/14; H01M 2220/20; B60K 1/04
See application file for complete search history.

(56) References Cited

U.S. PATENT DOCUMENTS

| 3,763,416 | A | * | 10/1973 | Jache | H02J 7/0091 |
| | | | | | 320/147 |
| 8,920,955 | B1 | | 12/2014 | Chuang | |
| 10,516,192 | B2 | * | 12/2019 | Prevost | B60L 58/24 |
| 2009/0044997 | A1 | * | 2/2009 | Picavet | H01M 2/1083 |
| | | | | | 180/68.5 |
| 2009/0236162 | A1 | | 9/2009 | Takasaki | |
| 2011/0244298 | A1 | | 10/2011 | Gruner et al. | |
| 2011/0256446 | A1 | | 10/2011 | Bronczyk | |
| 2012/0021260 | A1 | | 1/2012 | Yasui | |
| 2012/0040221 | A1 | | 2/2012 | Stoughton et al. | |
| 2013/0095360 | A1 | | 4/2013 | Niedzwiecki et al. | |
| 2013/0164592 | A1 | | 6/2013 | Maguire et al. | |

(Continued)

FOREIGN PATENT DOCUMENTS

| WO | 2012/067045 A1 | 5/2012 |
| WO | 2012/120091 A1 | 9/2012 |
| WO | 2014/061109 A1 | 4/2014 |

OTHER PUBLICATIONS

Third Office Action for CN Application No. 2016100520113 dated May 26, 2020.

*Primary Examiner* — Stephen J Yanchuk
(74) *Attorney, Agent, or Firm* — David B. Kelley; Carlson, Gaskey & Olds (57) ABSTRACT

A battery array frame may include a frame body extending along a longitudinal axis and including a top frame rail, a bottom frame rail, and frame arms that connect between the top frame rail and the bottom frame rail. An insert extends inside the frame body for increasing the stiffness of the frame body.

14 Claims, 6 Drawing Sheets

(56) References Cited

U.S. PATENT DOCUMENTS

| | | |
|---|---|---|
| 2013/0183573 A1 | 7/2013 | Yoshioka |
| 2013/0202940 A1 | 8/2013 | Gendlin et al. |
| 2013/0323561 A1 | 12/2013 | Brewer |
| 2014/0014418 A1 | 1/2014 | Komaki |
| 2014/0050966 A1 | 2/2014 | Merriman |
| 2014/0220391 A1 | 8/2014 | Fujii |
| 2014/0234691 A1 | 8/2014 | Lee et al. |
| 2014/0302383 A1 | 10/2014 | Amagai |
| 2015/0017504 A1 | 1/2015 | Isshiki |
| 2015/0162639 A1 | 6/2015 | Lee |
| 2015/0179995 A1 | 6/2015 | Nakamura |
| 2015/0249240 A1 | 9/2015 | Hihara |
| 2016/0056431 A1* | 2/2016 | Subramanian ...... H01M 2/1077 429/149 |
| 2016/0056433 A1 | 2/2016 | Yokoyama |
| 2016/0126523 A1 | 5/2016 | Arena |

\* cited by examiner

BATTERY ARRAY FRAME INCLUDING FRAME RAIL INSERT

CROSS REFERENCE TO RELATED APPLICATION

This is a divisional of U.S. patent application Ser. No. 14/607,309, which was filed on Jan. 28, 2015.

TECHNICAL FIELD

This disclosure relates to a battery assembly for an electrified vehicle. The battery assembly includes a battery array having a plurality of array frames. Each array frame includes a bottom frame rail having an embedded insert for increasing the stiffness of the array frame.

BACKGROUND

The need to reduce automotive fuel consumption and emissions is well known. Therefore, vehicles are being developed that either reduce or completely eliminate reliance on internal combustion engines. Electrified vehicles are one type of vehicle being developed for this purpose. In general, electrified vehicles differ from conventional motor vehicles because they are selectively driven by one or more battery powered electric machines. Conventional motor vehicles, by contrast, rely exclusively on the internal combustion engine to drive the vehicle.

High voltage battery assemblies typically include multiple battery arrays. Each battery array includes a plurality of battery cells and a support structure that generally surrounds the battery cells to build a cell stack. The battery arrays are secured to a tray of the battery assembly.

SUMMARY

A battery array frame according to an exemplary aspect of the present disclosure includes, among other things, a frame body extending along a longitudinal axis and including a top frame rail, a bottom frame rail and frame arms that connect between the top frame rail and the bottom frame rail. An insert extends inside the frame body.

In a further non-limiting embodiment of the foregoing battery array frame, the top frame rail includes at top surface having a first side and a second side that each include an alternating pattern of rigid snap arms and flexible snaps arms.

In a further non-limiting embodiment of either of the foregoing battery array frames, the insert is a metallic insert.

In a further non-limiting embodiment of any of the foregoing battery array frames, the metallic insert is made of steel, copper or brass.

In a further non-limiting embodiment of any of the foregoing battery array frames, the insert is made of a different material from the frame body.

In a further non-limiting embodiment of any of the foregoing battery array frames, the bottom frame rail includes a foot, and the insert extends into the foot.

In a further non-limiting embodiment of any of the foregoing battery array frames, the bottom frame rail includes a first foot at a first end and a second foot at a second end, the insert extending through the bottom frame rail between the first foot and the second foot.

In a further non-limiting embodiment of any of the foregoing battery array frames, the bottom frame rail includes a first foot that includes the insert and a second foot that includes a second insert.

In a further non-limiting embodiment of any of the foregoing battery array frames, the insert includes a bent portion inside a foot of the bottom frame rail.

In a further non-limiting embodiment of any of the foregoing battery array frames, the insert includes a plurality of threads.

A battery assembly according to another exemplary aspect of the present disclosure includes, among other things, a tray and a battery array positioned relative to the tray. The battery array includes a plurality of array frames. Each of the plurality of array frames includes feet having an imbedded metallic insert. A bracket is secured over the feet and mounted to the tray.

In a further non-limiting embodiment of the foregoing assembly, a heat exchanger is disposed between the tray and the battery array.

In a further non-limiting embodiment of either of the foregoing assemblies, the metallic insert is made of steel, brass or copper.

In a further non-limiting embodiment of any of the foregoing assemblies, the feet include a nub, and bent portions of the metallic insert extend inwardly from the nubs.

In a further non-limiting embodiment of any of the foregoing assemblies, the feet protrude outwardly from a frame body of each of the plurality of array frames near an intersection between a bottom frame rail and a frame arm.

A method according to another exemplary aspect of the present disclosure includes, among other things, positioning a battery array relative to a tray, the battery array including an array frame having a foot and an insert disposed inside the foot. The insert is configured to increase the stiffness of the foot. The method further includes positioning a bracket over the foot and securing the bracket to the tray.

In a further non-limiting embodiment of the foregoing method, the step of positioning the battery array relative to the tray includes positioning a heat exchanger between the battery array and the tray.

In a further non-limiting embodiment of either of the foregoing methods, the step of securing the bracket to the tray includes fastening the bracket to the tray using a fastener.

In a further non-limiting embodiment of any of the foregoing methods, the insert is a metallic insert embedded inside a bottom frame rail of the array frame.

In a further non-limiting embodiment of any of the foregoing methods, the insert includes a bent portion extending inside the foot.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure describes exemplary battery assemblies that may be employed within electrified vehicles. The battery assemblies include one or more battery arrays constructed of a plurality of array frames that are stacked and connected together. Each array frame includes a frame body extending along a longitudinal axis and including a top frame rail, a bottom frame rail and frame arms that connect between the top frame rail and the bottom frame rail. An insert extends inside of the frame body to increase the stiffness of the array frame. These and other features are discussed in greater detail in the following paragraphs of this disclosure.

Figure 1:
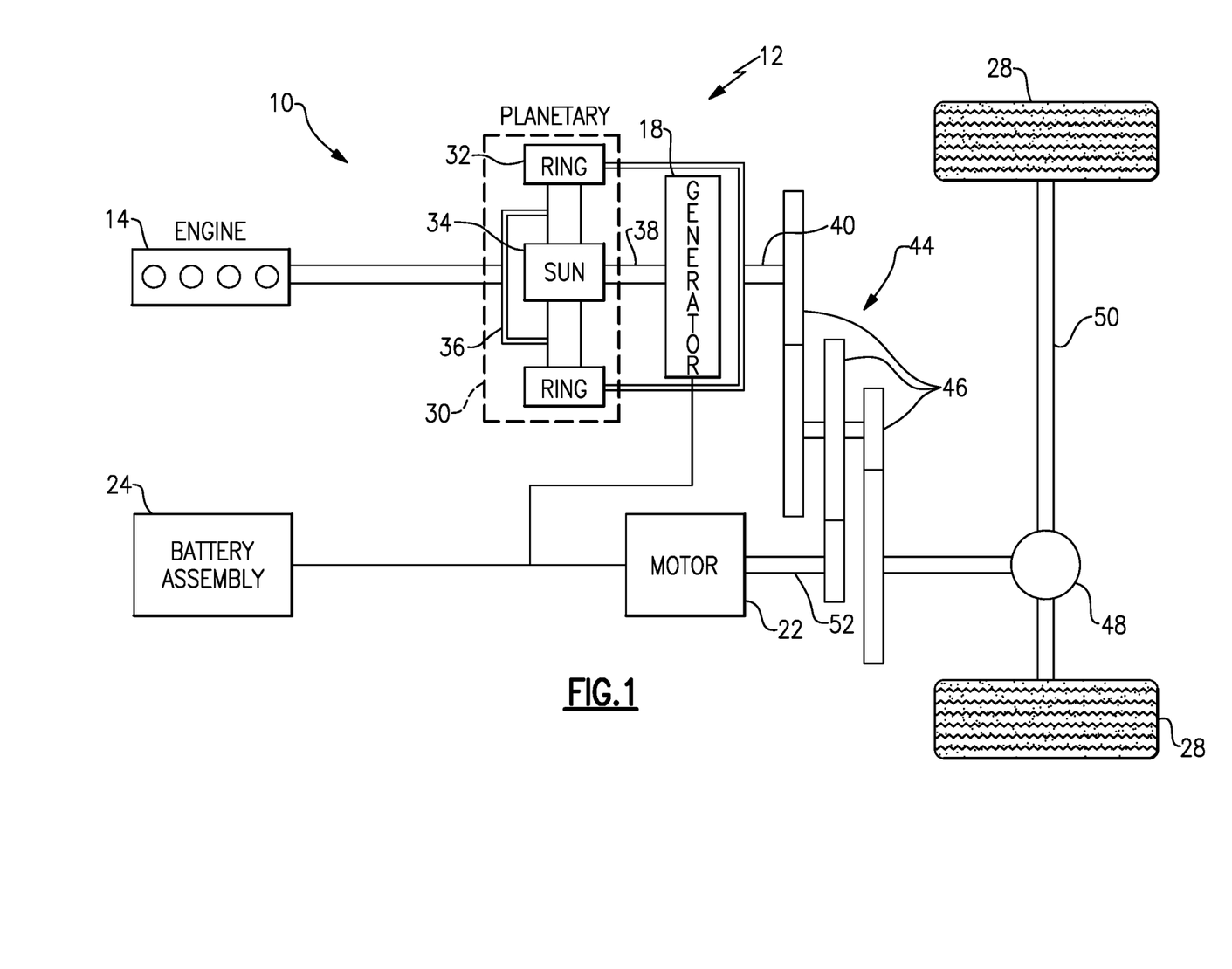
FIG. 1 schematically illustrates a powertrain of an electrified vehicle.

FIG. 1 schematically illustrates a powertrain 10 for an electrified vehicle 12. Although depicted as a HEV, it should be understood that the concepts described herein are not limited to HEV's and could extend to other electrified vehicles, including, but not limited to, plug-in hybrid electric vehicles (PHEV's) and battery electric vehicles (BEV's).

In one embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery assembly 24. In this example, the second drive system is considered an electric drive system of the powertrain 10. The first and second drive systems generate torque to drive one or more sets of vehicle drive wheels 28 of the electrified vehicle 12.

The engine 14, such as an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery assembly 24.

The battery assembly 24 is an example type of electrified vehicle battery assembly. The battery assembly 24 may include a high voltage battery pack that includes a plurality of battery arrays capable of outputting electrical power to operate the motor 22 and the generator 18. Other types of energy storage devices and/or output devices can also be used to electrically power the electrified vehicle 12.

In one non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery assembly 24 state of charge up to its maximum allowable discharging rate under certain driving patterns/cycles. The EV mode is an example of a charge depleting mode of operation for the electrified vehicle 12. During EV mode, the state of charge of the battery assembly 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally be operated in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery assembly 24 at a constant or approximately constant level by increasing the engine 14 propulsion usage. The electrified vehicle 12 may be operated in other operating modes in addition to the EV and HEV modes within the scope of this disclosure.

Figure 2A:
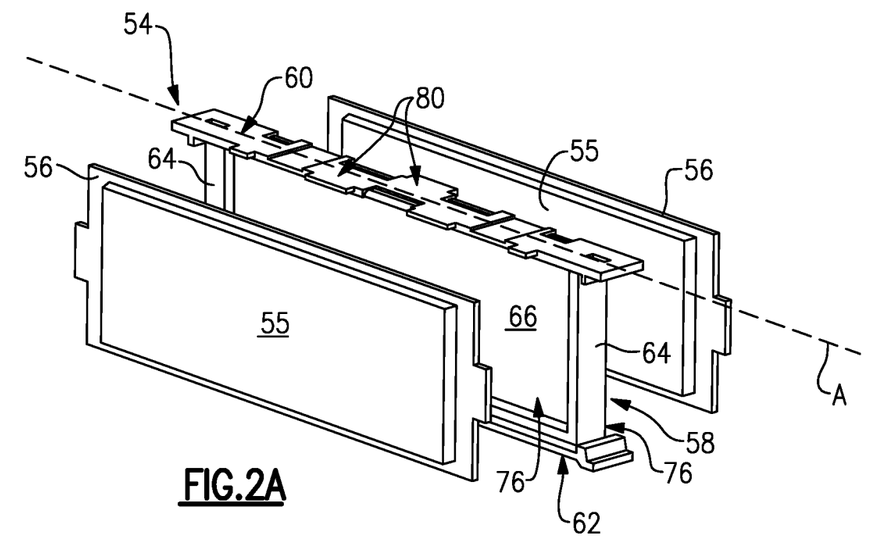
FIGS. 2A and 2B illustrate an array frame of a battery array.
Figure 2B:
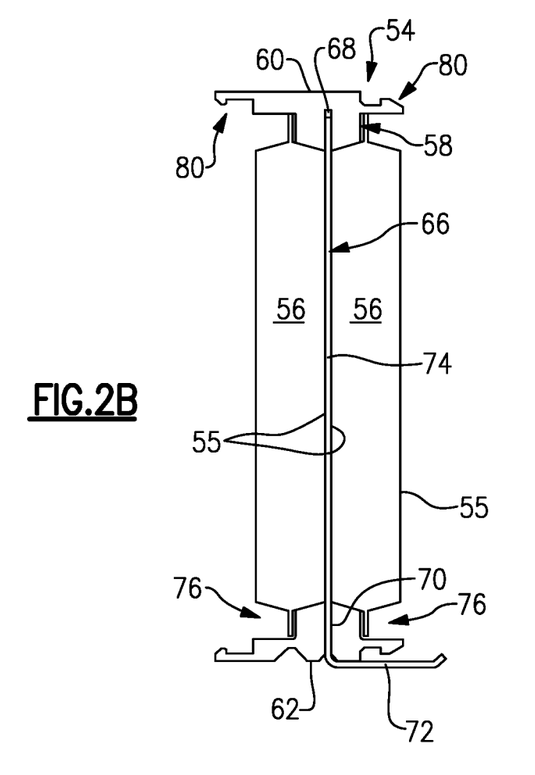

FIGS. 2A and 2B illustrate an array frame 54 that houses at least two battery cells 56. A plurality of array frames 54 may be stacked side-by-side to build a battery array (see, e.g., battery array 78 of FIG. 3). One or more battery arrays that include multiple array frames 54 and battery cells 56 can be assembled and mounted inside a battery assembly, such as the battery assembly 24 of the electrified vehicle 12 of FIG. 1, to electrically power an electrified vehicle.

In one embodiment, the battery cells 56 are pouch cells for a high voltage battery assembly. One non-limiting example of a suitable pouch battery cell is a lithium-ion polymer battery. However, other types of battery cells are also contemplated, and it should be understood that this disclosure is not limited to pouch type battery cells.

The array frame 54 includes a frame body 58 that extends along a longitudinal axis A (see FIG. 2A). The frame body 58 includes a top frame rail 60, a bottom frame rail 62 and frame arms 64 that connect between the top frame rail 60 and the bottom frame rail 62. In one embodiment, the top frame rail 60 and the bottom frame rail 62 extend in parallel with the longitudinal axis A, and the frame arms 64 are transverse to the longitudinal axis A. In another embodiment, the frame body 58 is a unitary, plastic structure.

In another non-limiting embodiment, a thermal fin 66 may be at least partially embedded within the frame body 58 and extend between the top frame rail 60 and the bottom frame rail 62. In one embodiment, the thermal fin 66 is an aluminum thermal fin. However, other materials are additionally contemplated. The thermal fin 66 separates the battery cells 56 and may contact side faces 55 of the battery cells 56. During certain conditions, the thermal fin 66 removes heat from the battery cells 56. In other conditions, the thermal fin 66 may add heat to the battery cells 56. The frame body 58 establishes pockets 76 on both sides of the thermal fin 66. The battery cells 56 may be received within the pockets 76 to house the battery cells 56 within the array frame 54.

The thermal fin 66 may include a body 74 and a leg 72 that extends from the body 74 (see FIG. 2B). The body 74 may be embedded or molded into the frame body 58, while the leg 72 extends outside of the frame body 58. In another embodiment, the thermal fin 66 may be inserted into the frame body 58 such that one end of the body 74 is located within a groove 68 formed in the top frame rail 60 of the frame body 58, and an opposite end of the body 74 may extend through a passage 70 formed through the bottom frame rail 62 of the frame body 58. The leg 72 of the thermal fin 66 may be oriented transversely to the body 74 so it extends underneath the bottom frame rail 62 to the position outside of the frame body 58. In one embodiment, the leg 72 extends to a position that is beyond the side face 55 of the battery cell 56 housed substantially above the leg 72.

The frame body 58 may further include a plurality of retention features 80 that are integrated into the top frame rail 60. The bottom frame rail 62 could similarly include integrated retention features, although not shown in this embodiment. The retention features 80 may engage corresponding retention features of adjacent array frames 54 to build a battery array. In yet another embodiment, the frame arms 64 include retention features similar to the retention features 80 for connecting adjacent array frames 54.

Figure 3:
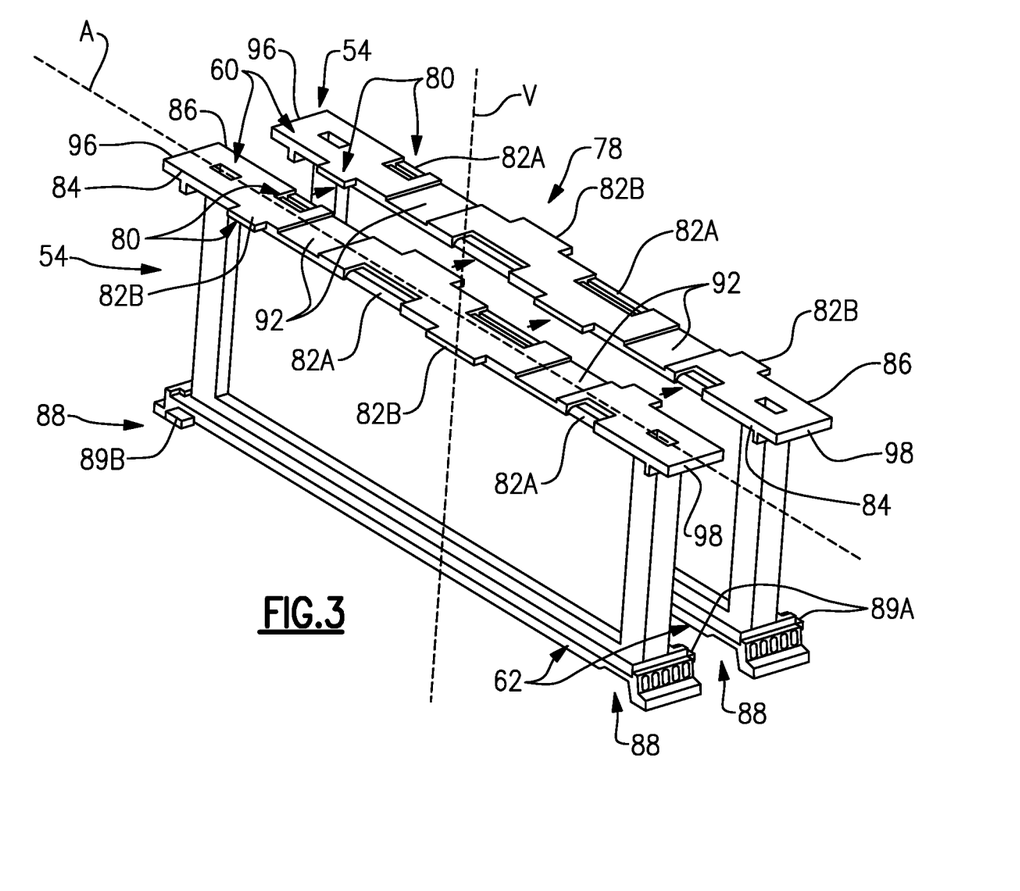
FIG. 3 illustrates a battery array including stacked array frames.

Referring to FIG. 3, a plurality of array frames 54 may be stacked side-by-side to construct a battery array 78. Two array frames 54 are depicted in FIG. 3, which omits the battery cells for clarity. This disclosure is not limited to any specific number of array frames 54 and/or battery cells 56 and is not intended to be limited to the specific configurations that are illustrated by the various Figures.

In one embodiment, the top frame rail 60 of the frame body 58 of each array frame 54 is rotationally symmetric about a vertical axis V that is transverse to the longitudinal axis A. In another embodiment, the bottom frame rail 62 is rotationally symmetric about the vertical axis V. In yet another embodiment, both the top frame rail 60 and the bottom frame rail 62 are rotationally symmetric about the vertical axis V. In this way, the array frames 54 can be provided in a repeating fashion to construct the battery array 78. The symmetry of the top frame rail 60 and/or the bottom frame rail 62 permits the use of common array end plates (not shown), thereby reducing the cost and complexity of the battery array 78. In other words, unique left hand and right hand array end plates are not required to construct the battery array 78.

The top frame rail 60 of the frame body 58 includes a first side 84 and a second side 86 that both extend between opposing ends 95, 97. The first side 84 and the second side 86 both include a plurality of retention features 80 for connecting the array frame 54 to an adjacent array frame 54. In one embodiment, the retention features 80 protrude from both the first side 84 and the second side 86 of the top frame rail 60. In another embodiment, the top frame rail 60 of each array frame 54 is substantially flat.

In another non-limiting embodiment, the retention features 80 of the top frame rail 60 include a plurality of rigid snap arms 82A and a plurality of flexible snap arms 82B oriented in an alternating pattern along each of the first side 84 and the second side 86 of the top frame rail 60. Because the top frame rail 60 is rotationally symmetric about the vertical axis V, each flexible snap arm 82B of the first and second sides 84, 86 are aligned directly across the top frame rail 60 from a rigid snap arm 82A on the opposite side 84, 86. Thus, the array frames 54 provide a repeating design that simplifies assembly and reduces complexity of the battery array 78.

The rigid snap arms 82A and the flexible snap arms 82B of both the first side 84 and the second side 86 are oriented to engage corresponding features of an adjacent array frame 54 to connect the array frames 54 together. For example, the flexible snap arms 82B may be received over the rigid snap arms 82A to connect adjacent array frames 54. The flexible snap arms 82B may flex slightly as the rigid snap arms 82A are pushed toward the flexible snap arms 82B.

The top frame rail 60 of each array frame 54 may additionally include one or more recessed grooves 92. In one embodiment, each recessed groove 92 extends between the first side 84 and the second side 86 of the top frame rail 60 and is disposed between a rigid snap arm 82A and a flexible snap arm 82B on the first side 84 and the second side 86. The recessed grooves 92 of adjacent array frames 54 align with one another and can accommodate tension straps (not shown) that bind the battery array 78 in a lengthwise direction to maintain a consistent array length and resist bulging of the battery cells 56 during certain conditions.

Figure 4:
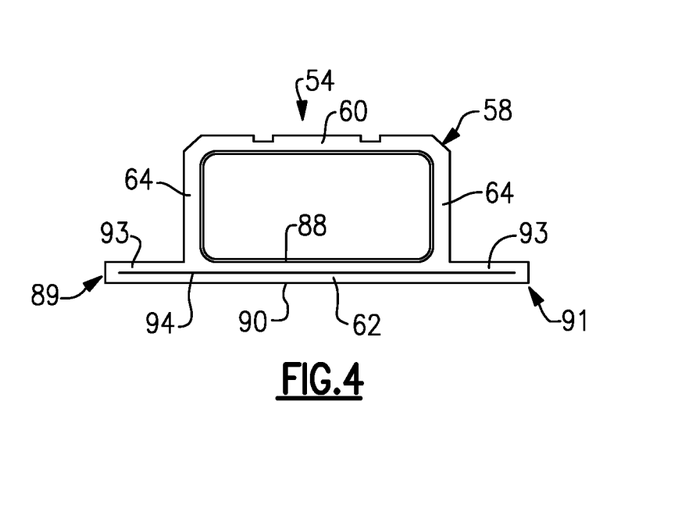
FIG. 4 is a cross-sectional view of an array frame.

FIG. 4 illustrates additional features associated with an array frame 54. Like the array frames 54 shown in FIGS. 1-3, the array frame 54 includes a top frame rail 60, a bottom frame rail 62 and frame arms 64. The top frame rail 60, the bottom frame rail 62 and the frame arms 64 establish the frame body 58, which may be constructed from any plastic material.

The bottom frame rail 62 of the array frame 54 may include a top wall 88 and a bottom wall 90 that extend between the opposing ends 89, 91. A foot 93 may protrude outwardly from the each of the opposing ends 89, 91. In one embodiment, the feet 93 protrude outwardly from the frame body 58 near the intersection of the bottom frame rail 62 and the frame arms 64. The feet 93 may be an extension of the bottom frame rail 62 and therefore extend in parallel with the bottom frame rail 62 but are transverse to the frame arms 64. The feet 93 provide a substantially flat surface for positioning the array frame 54 on a supporting surface, such as a tray (see for example, FIGS. 10 and 11).

An inset 94 may be disposed inside the bottom frame rail 62 for increasing the stiffness of the array frame 54, and more particularly, for increasing the stiffness near the feet 93. Increasing stiffness in this manner results in less material necessary to form the array frame 54, thereby reducing overall part thickness. In one non-limiting embodiment, the insert 94 is embedded inside the bottom frame rail 62 between the top wall 88 and the bottom wall 90 and extends between the opposing ends 89, 91. The bottom frame rail 62 may be formed around the insert 94, such as during an injection molding process.

The insert 94 may be made from a variety of materials. In one embodiment, the insert 94 is a metallic insert made of either steel or brass. In another embodiment, the insert 94 is made of ceramic materials. Other materials are also contemplated.

Figure 5:
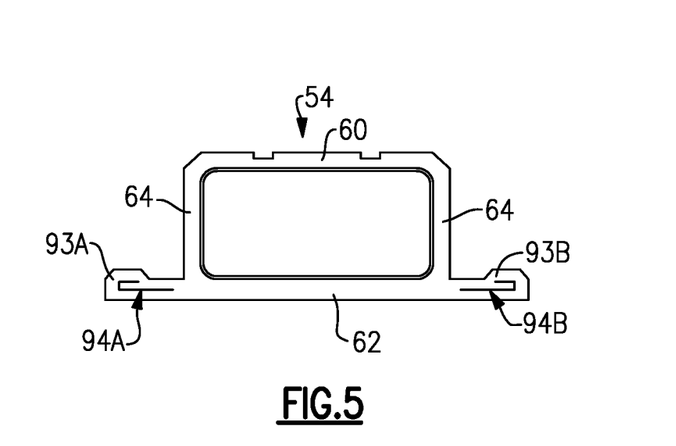
FIG. 5 illustrates another array frame.
Figure 6:
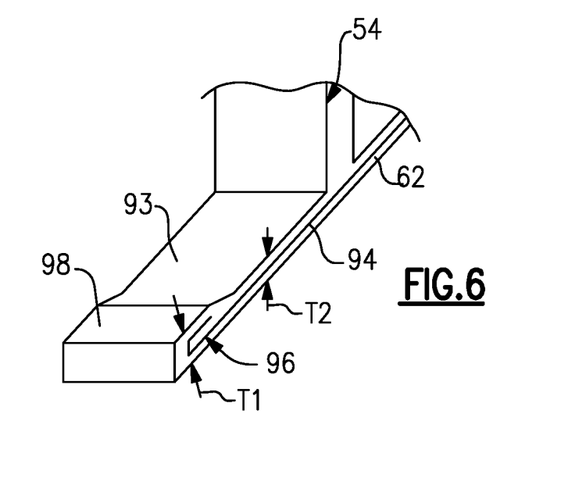
FIG. 6 illustrates an insert of an array frame according to a first embodiment of this disclosure.
Figure 7:
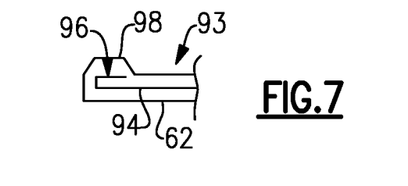
FIG. 7 illustrates the insert of FIG. 6.

In an alternative embodiment, shown in FIG. 5, the array frame 54 may include multiple inserts 94A, 94B. For example, a first foot 93A of the bottom frame rail 62 may include the first insert 94A and a second foot 93B may include the second insert 94B. In other words, it is not necessary for a single insert to extend the entire length between the opposing ends 89, 91.

FIGS. 6, 7, 8 and 9 illustrate various inserts 94 that could be imbedded inside the array frame 54. Although the inserts 94 are shown in these embodiments as extending inside the bottom frame rail 62, any portion of the frame body 58 could include an insert. As is also evident from these figures, the insert 94 could embody a variety of sizes, shapes and configurations. For example, the inset 94 of FIGS. 6 and 7 includes a bent portion 96. The bent portion 96 extends within a foot 93 of the bottom frame rail 62 of the array frame 54. In one embodiment, the bent portion 96 is positioned inwardly from a nub 98 of the foot 93. The nub 98 may include a first thickness T1 that is greater than a second thickness T2 of a remaining portion of the foot 93. The bent portion 96 may be U-shaped and is configured to further increase the stiffness of the feet 93.

Figure 8:
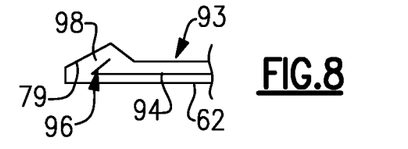
FIG. 8 illustrates an insert of an array frame according to another embodiment of this disclosure.

Referring to FIG. 8, the bent portion 96 of the insert 94 could alternatively be V-shaped. The bent portion 96 can be arranged in any shape. In another embodiment, the bent portion 96 is shaped to match a corresponding shape of the nub 98 of the foot 93. For example, the bent portion 96 may extend in parallel with a wall 79 of the nub 98.

Figure 9:
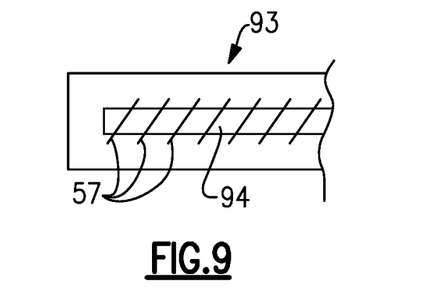
FIG. 9 illustrates an insert of an array frame according to yet another embodiment of this disclosure.

In yet another embodiment, shown in FIG. 9, the insert 94 may be a threaded insert that includes a plurality of threads 57. The threads 57 facilitate bonding between the material of the array frame 54 and the material of the insert 94, which are different materials.

Figure 10:
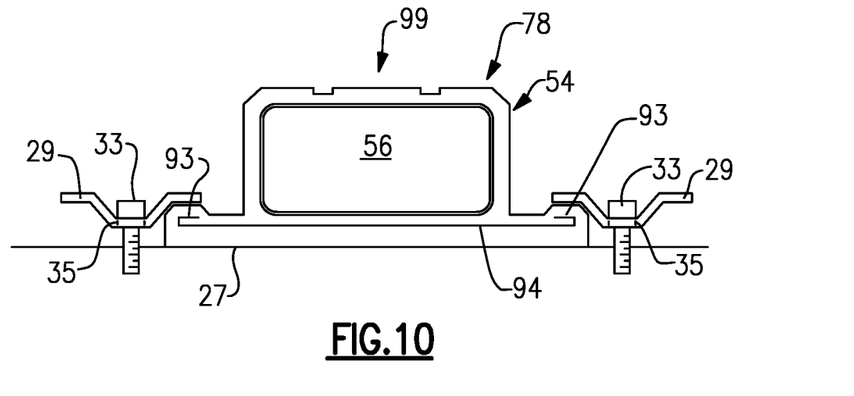
FIG. 10 illustrates a battery assembly.

FIG. 10 illustrates a battery assembly 99 having a battery array 78, a tray 27 and brackets 29. The battery array 78 is constructed of a plurality of array frames 54 (stacked into the page in FIG. 10) that are connected together and which each house battery cells 56. Each array frame 54 includes an insert 94.

In one non-limiting assembly method, the battery array 78 is placed on the tray 27. The brackets 29 are then positioned over top of the feet 93 of the array frames 54 of the battery array 78. Next, the brackets 29 are mounted to the tray 27. In one embodiment, the brackets 29 are mounted to the tray 27 using fasteners 33 to fixedly secure the battery array 78 to the tray 27. The fasteners 33 may be inserted through openings 35 in the brackets 29. Once mounted, the brackets 29 extend over top of the feet 93. The inserts 94 increase the stiffness of the array frames 54 during loading events that may act on the battery array 78.

Figure 11:
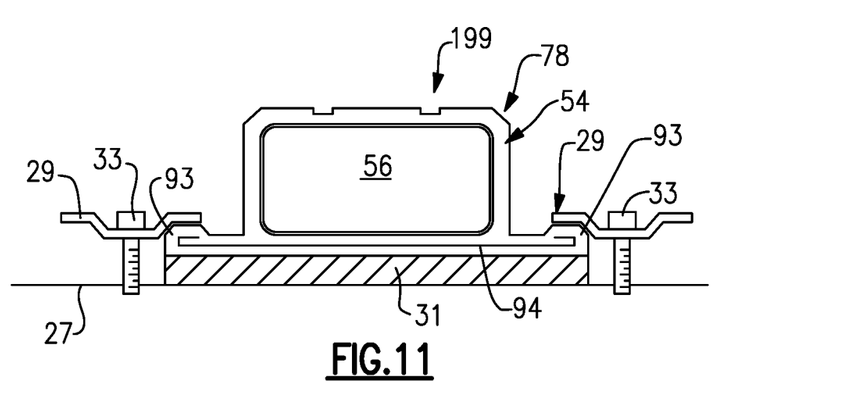
FIG. 11 illustrates another battery assembly.

FIG. 11 illustrates another battery assembly 199. In this disclosure, like reference numbers designate like elements where appropriate and reference numerals with the addition of 100 or multiples thereof designate modified elements that are understood to incorporate the same features and benefits of the corresponding original elements.

The battery assembly 199 is similar to the battery assembly 99 of FIG. 10 except, in this embodiment, the battery assembly 199 includes a heat exchanger 31. The heat exchanger 31 is supported between the battery array 78 and the tray 27 and functions to remove heat generated by the battery cells 56 during certain conditions, or alternatively to heat the battery cells 56 during other conditions. In one embodiment, the heat exchanger 31 is configured as a cold plate. However, other implementations are also contemplated.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method, comprising:
    positioning a battery array relative to a tray of a battery pack, the batteryarray including an array frame and an insert disposed inside afoot of the arrayframe,
    wherein the insert is configured to increase the stiffness of the arrayframe;
    positioning a bracket over top of the foot the arrayframe; and
    securing the bracket to the tray with a fastener without passing the fastener through the array frame.

2. The method as recited in claim 1, wherein positioning the battery array relative to the tray includes positioning a heat exchanger between the battery array and the tray.

3. The method as recited in claim 1, wherein the insert is a metallic insert embedded inside a frame rail of the array frame.

4. The method as recited in claim 1, wherein the insert includes a bent portion extending inside the foot of the array frame.

5. The method as recited in claim 4, wherein the bent portion extends inwardly from a nub of the foot.

6. The method as recited in claim 1, wherein the battery array includes a plurality of interconnected array frames that each include a foot and an insert that extends inside the foot.

7. The method as recited in claim 1, comprising a thermal fin held within the array frame, wherein the thermal fin is a separate structure from the insert.

8. The method as recited in claim 7, wherein the thermal fin separates a first battery cell from a second battery cell of the battery array.

9. The method as recited in claim 1, wherein the insert is embedded inside the array frame without any portion of the insert protruding outside of the array frame.

10. The method as recited in claim 1, wherein the array frame is made of plastic and the insert is made of steel, brass, or copper.

11. The method as recited in claim 1, wherein the array frame includes a monolithic frame body that includes a top frame rail, a bottom frame rail, and frame arms that extend between the top frame fail and the bottom frame rail.

12. The method as recited in claim 11, wherein the bottom frame rail of the monolithic frame body includes a first foot and a second foot, wherein the insert extends inside the first foot and the second foot.

13. The method as recited in claim 11, wherein the bottom frame rail of the monolithic frame body includes a first foot and a second foot, wherein the insert extends inside the first foot and a second insert extends inside the second foot.

14. A method, comprising:

positioning a battery array relative to a tray of a battery pack,     wherein the battery array includes a plastic array frame that includes a first foot and a second foot, a metallic insert that extends inside at least one of the first foot or the second foot of the plastic array frame for increasing the stiffness of the plastic array frame, and a battery cell received within the array frame;

positioning a first bracket over the first foot;

securing the first bracket to the tray with a first fastener without passing the first fastener through the first foot;

positioning a second bracket over the second foot; and securing the second bracket to the tray with a second fastener without passing the second fastener through the second foot.

\* \* \* \* \*